D. X. POINTER.
AUTOMOBILE HEADLIGHT.
APPLICATION FILED MAR. 6, 1917.
1,249,485.
Patented Dec. 11, 1917.
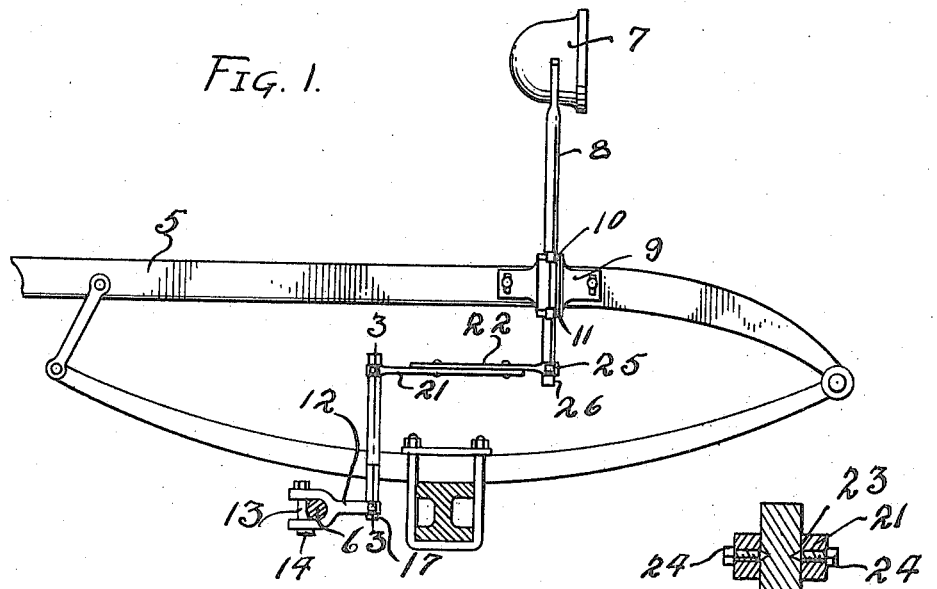
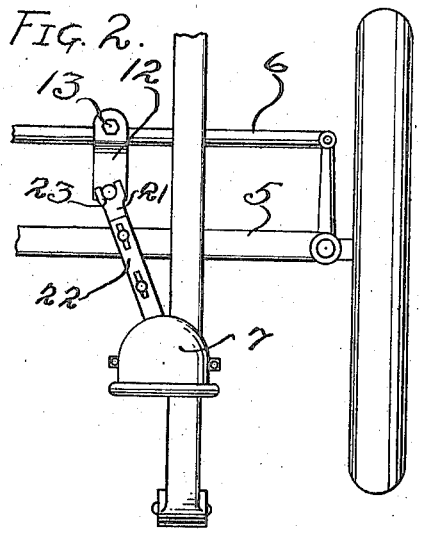
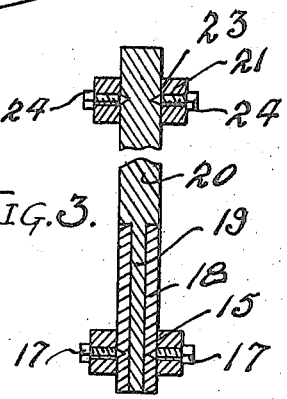
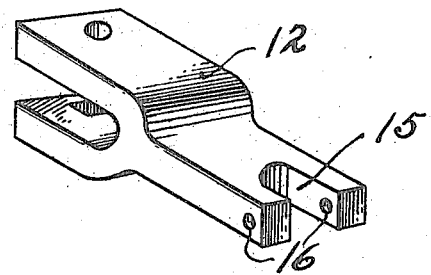
Inventor
D. X. Pointer.
Witnesses
By
Attorneys

UNITED STATES PATENT OFFICE.

DON X. POINTER, OF CALDWELL, KANSAS.

AUTOMOBILE-HEADLIGHT.

1,249,485.   Specification of Letters Patent.   Patented Dec. 11, 1917.

Application filed March 6, 1917. Serial No. 152,670.

*To all whom it may concern:*

Be it known that I, DON X. POINTER, a citizen of Canada, subject to King of Great Britain, residing at Caldwell, in the county of Sumner, State of Kansas, have invented certain new and useful Improvements in Automobile-Headlights; and I do hereby declare the following to be a full, clear, and exact description of the invention, such as will enable others skilled in the art to which it appertains to make and use the same.

This invention is an improvement in head lights for automobiles and has particular reference to a mechanism for turning the head lights in the direction of travel of the machine.

An object of the invention is the provision of a simple and improved means for automatically turning the head lights when the machine is rounding corners or curves so that the rays of light will be cast in the direction to be traveled by the machine.

Another object is to provide a mechanism which may be manufactured at a minimum cost and which is readily applicable to a machine of ordinary construction.

The inventive idea involved is capable of receiving a variety of mechanical expressions, one of which for the purpose of illustrating the present invention, is shown in the accompanying drawings, wherein:—

Figure 1 is a fragmentary side elevation of a machine showing the invention applied thereto.

Fig. 2 is a plan view.

Fig. 3 is a section on the line 3—3 of Fig. 1.

Fig. 4 is a detail perspective view of one of the clamping members employed.

Referring more particularly to the accompanying drawing in which like reference characters indicate similar parts the numeral 5 indicates the frame of a machine and 6 the guide rods which are connected to the wheels and steering mechanism.

The head lights 7 are each carried by the upper end of a rotatable standard 8 mounted in a bearing 9 carried by the frame 5 and have upper and lower movable collars 10 and 11 secured thereto and engaging the upper and lower ends of the bearing 9 whereby to prevent longitudinal movement of said standard in said bearing.

A clamp 12 for each head light is secured to the guide rod 6 and is adapted to receive the same and is retained in position thereon by means of a bolt 13 having an enlarged head 14. The clamp 12 is bifurcated, as indicated at 15, in its forward end, and is provided with oppositely disposed openings 16 which receive the screw fasteners 17, the inner ends of which engage and pivotally support, in the bifurcation 15, a sleeve member 18. This sleeve member receives the lower reduced end 19 of a rod 20 which is rotatable in said sleeve member in order to permit of a swinging of the head lights 7.

A connection is established between the upper end of the rod 20 and the lower end of the standard 8 and this connection preferably consists of a pair of relatively adjustable slotted arms 21 and 22, the former having its rear end bifurcated as indicated at 23 to embrace the upper end of the rod 20 and the ends of the bifurcation receive the screw members 24 which engage said rod to pivotally connect the same to said arm. The arm 22 is likewise provided at its forward end with a bifurcation 25 which embraces the lower end of the standard 28 and receives the screws 26 which pivotally connect the arm 22 to said standard. This connection is primarily designed for the purpose of permitting relative movement of the parts owing to the action of the springs of the vehicle and it will be apparent from the foregoing description that when the guide rod 6 is shifted the connection consisting of the arms 21 and 22 will be swung about a pivot formed by the attachment of the arm 22 to the lower end of the standard 8 and the latter will be rotated in its bearing 9 to shift the head light 7 in the direction of travel of the machine.

What is claimed is:—

1. In a mechanism for automatically turning the head lights of a vehicle and the combination with the frame of a vehicle and a steering rod for the wheels thereof, of bearings carried by said frame, a head light carrying standard rotatably mounted in each of said bearings, a clamp associated with each standard and secured to said steering rod, a sleeve member pivotally connected to said clamp, a rod rotatably mounted in said sleeve member, and an adjustable connection between and pivoted to said rod and said standard.

2. In a mechanism for automatically turning the head lights of a vehicle and the combination with the frame of a vehicle and a steering rod for the wheels thereof, of bearings carried by said frame, a head light carrying standard rotatably mounted in each of said bearings, a clamp associated with each standard and secured to said steering rod, a sleeve member pivotally connected to said clamp, a rod rotatably mounted in said sleeve member, and a connection between said rod and standard and including relatively adjustable arms pivoted to said rod and standard.

3. In a mechanism for automatically turning the head lights of a vehicle and the combination with the frame of a vehicle and a steering rod for the wheels thereof, of rotatable head light supporting standards carried by said frame, a rotatable rod associated with each standard and having a pivotal connection with the steering rod of the vehicle, and an adjustable connection pivoted to said rod and said standard.

4. In a mechanism for automatically turning the head lights of a vehicle and the combination with the frame of a vehicle and a steering rod for the wheels thereof, of rotatable head lights supporting standards carried by said frame, a rotatable rod associated with each standard and having a pivotal connection with the steering rod of the vehicle and adapted to swing about an axis parallel to said rod, and an adjustable connection between said rod and said standard, the ends of said connection being pivoted to said rod and standard, the axes of the last named pivotal connection being parallel with the pivotal connection of the rotatable rod with said steering rod.

In testimony whereof, I affix my signature, in the presence of two witnesses.

DON X. POINTER.

Witnesses:
ARTHUR KING,
IRA SHOWALTER.

Copies of this patent may be obtained for five cents each, by addressing the "Commissioner of Patents, Washington, D. C."